Oct. 7, 1924.

C. E. BORING

TRACTOR

Filed June 10, 1922    3 Sheets-Sheet 1

1,511,021

Inventor
Charles E. Boring
By Ira J. Wilson
Atty.

Oct. 7, 1924.  
C. E. BORING  
1,511,021  
TRACTOR  
Filed June 10, 1922   3 Sheets-Sheet 2

Inventor  
Charles E. Boring  
By Ira J. Wilson  
Atty.

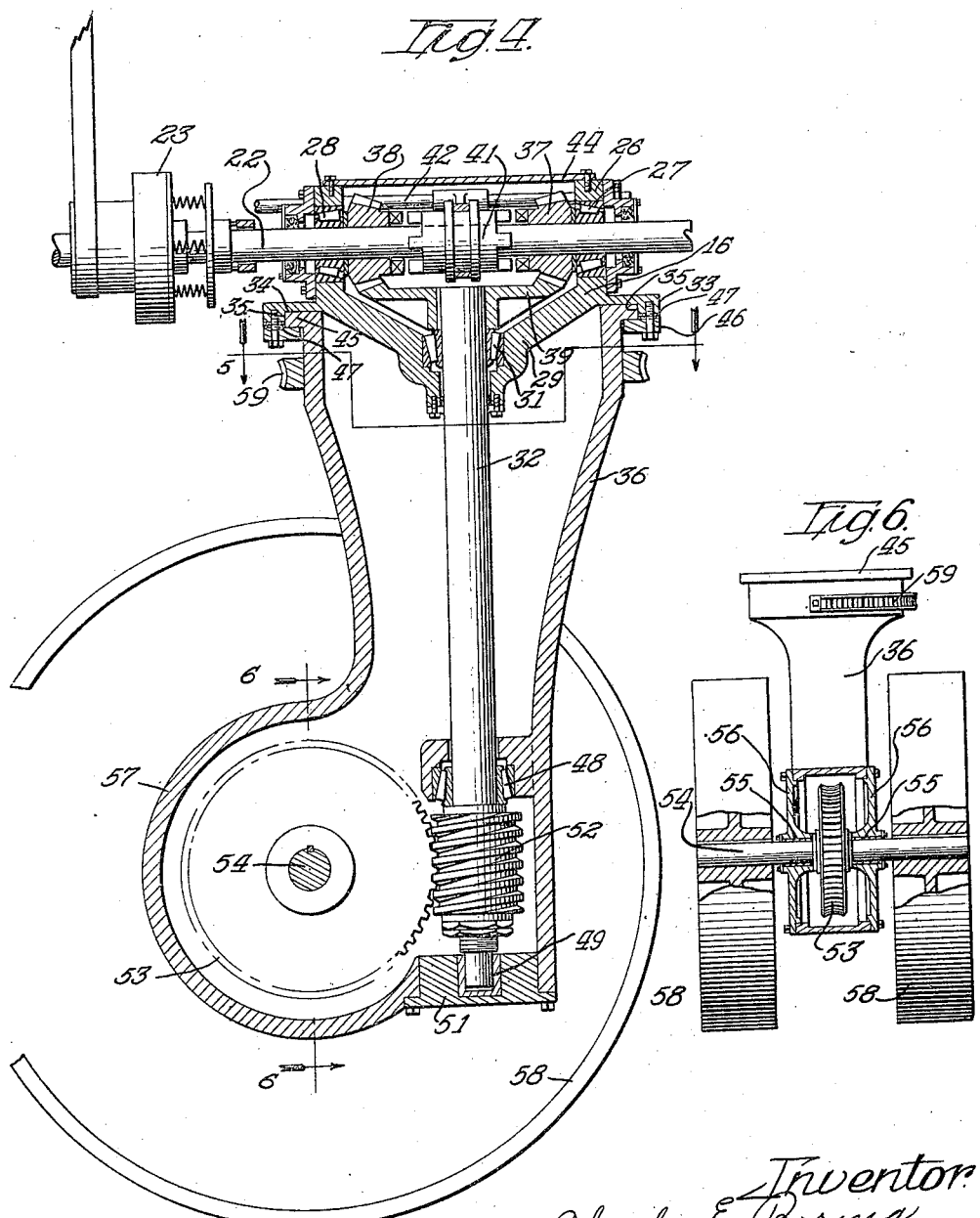

Patented Oct. 7, 1924.

1,511,021

UNITED STATES PATENT OFFICE.

CHARLES E. BORING, OF ROCKFORD, ILLINOIS.

TRACTOR.

Application filed June 10, 1922. Serial No. 567,268.

*To all whom it may concern:*

Be it known that I, CHARLES E. BORING, a citizen of the United States, residing at Rockford, in the county of Winnebago and State of Illinois, have invented certain new and useful Improvements in Tractors, of which the following is a specification.

This invention pertains to tractors of the driven steering-wheel type, and has more particular reference to those having a special wheel base wherein one or more steering wheels are driven.

I have aimed primarily to provide a generally simplified and improved tractor, which is propelled by the steering wheels and in which an extremely simple and practical driving mechanism is employed.

Another object is to provide a tractor unit of the driven steering wheel type comprising a motor-carrying frame and a pair of closely associated caster-like steering wheels at the front of said frame adapted to be driven by the motor. This frame is adapted to be attached at its rear end to any of various farm implements or other vehicles, and is especially adapted for attachment to a two-row cultivator, thereby providing a motor-propelled implement supported by the two cultivator wheels and by the two centrally disposed steering wheels, which in effect, act as a single wheel.

I have also aimed to provide in a tractor unit of the character described, a novel organization of driving or propelling mechanism, including means whereby the operator standing at the front of the tractor may manually operate said mechanism for moving the tractor forward or backward independently of the motor.

My invention also contemplates so co-ordinating the train of propelling parts and those parts which support and hold them in operative relation, as to obtain a most simple and compact arrangement, permitting of economical production and promoting durability.

Other objects and attendant advantages will be appreciated by those skilled in this art as the invention becomes better understood by reference to the following description when considered in connection with the accompanying drawings, in which—

Fig. 4 is a vertical sectional view taken substantially on the line 4—4 of Fig. 3;

Fig. 6 is a vertical sectional view taken substantially on the line 6—6 of Fig. 4.

Figure 1:
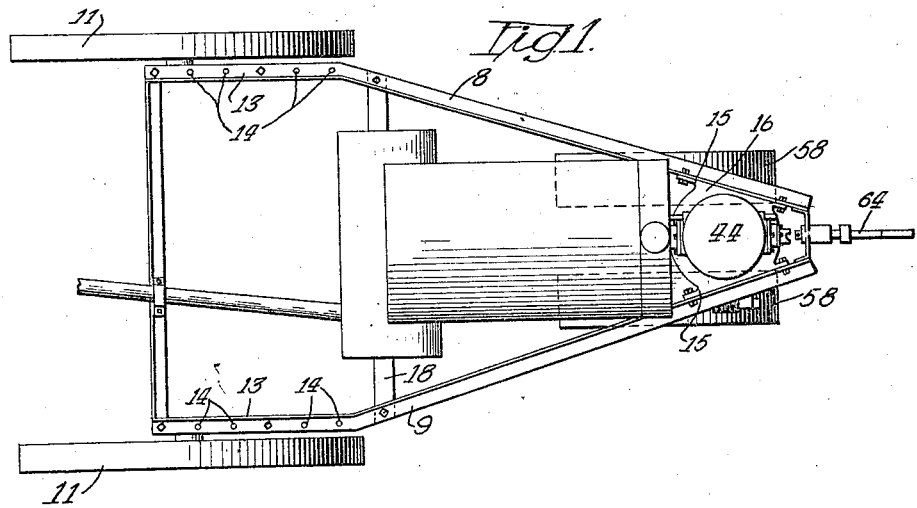
Figure 1 is a top view of a tractor embodying my invention.
Figure 2:
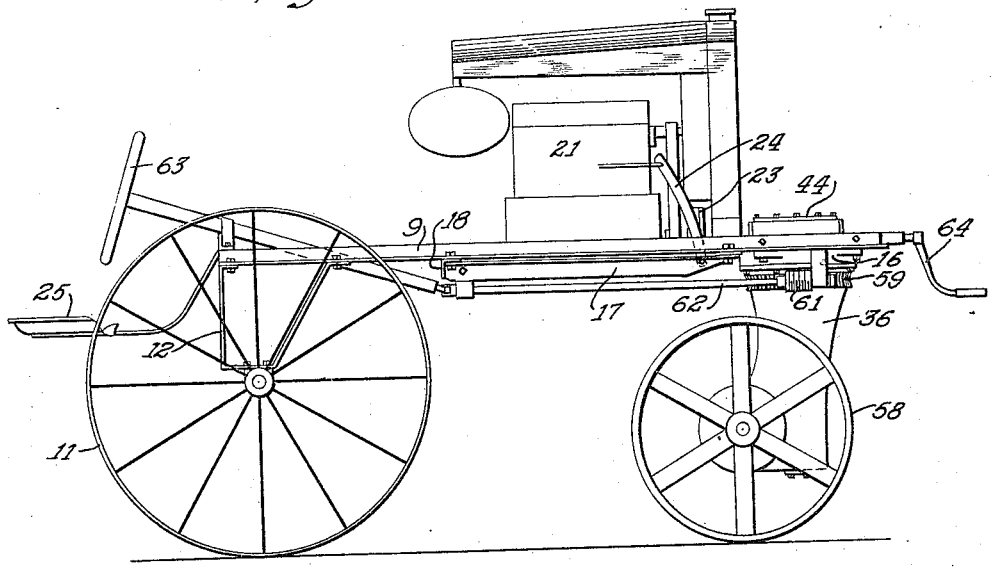
Fig. 2 is a side elevation of the tractor.
Figure 3:
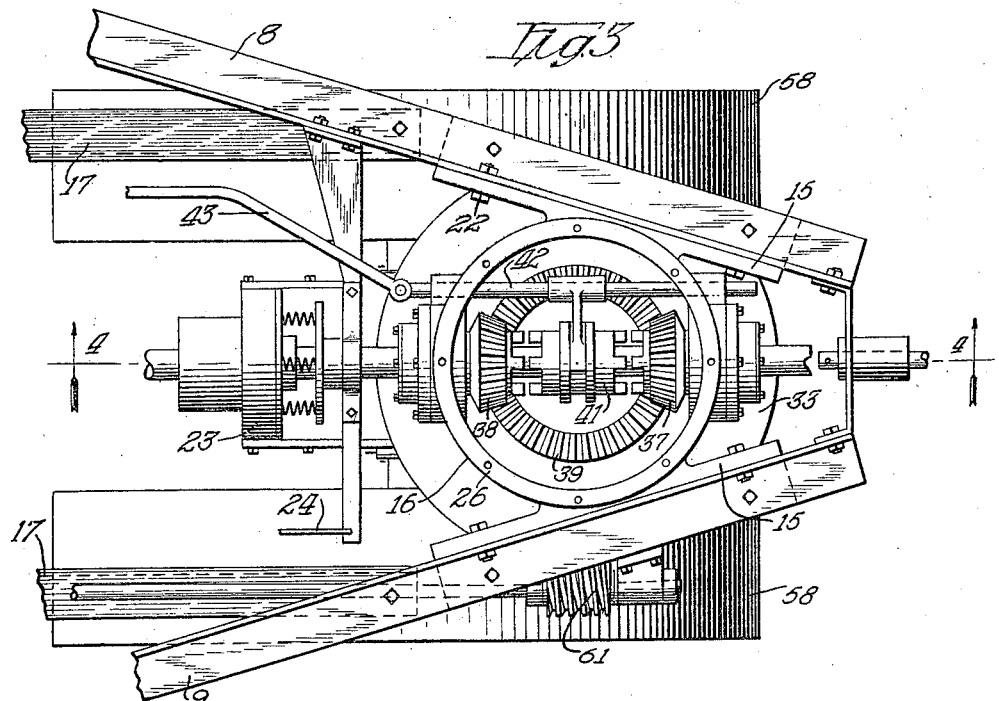
Fig. 3 is an enlarged top view of the front portion of the tractor, with the cover of the gear casing removed.
Figure 5:
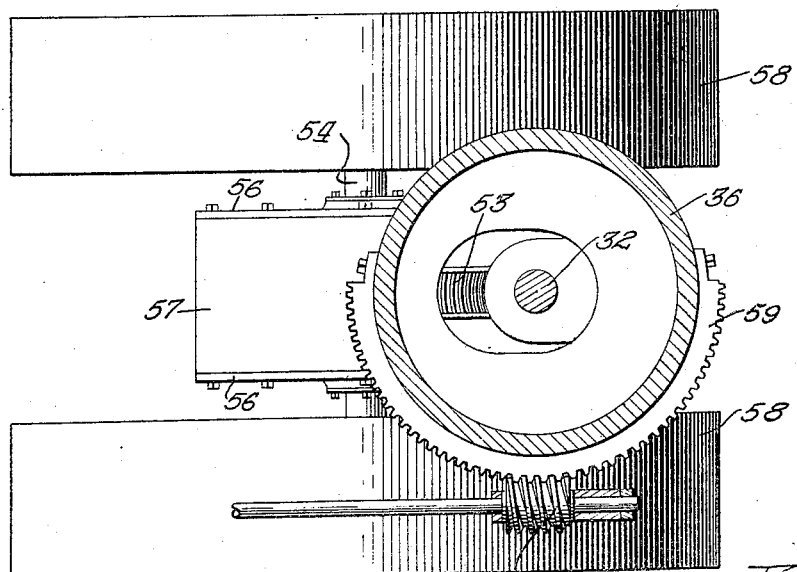
Fig. 5 is a horizontal sectional view taken on the line 5—5 of Fig. 4.

My invention comprehends the provision of a motor-supporting frame carried at its front end by steering wheels arranged in such close relation and so associated with the frame as to serve practically as a single caster wheel except that provision is made for steering and driving this wheel or wheels. The frame of this unstable tractor unit is adapted to be bolted or otherwise secured at its rear end to any of various farm implements or other vehicles, and in the present instance, I have shown the side sills 8 and 9 connected to a suitable pair of carrying wheels 11 through the agency of brackets 12, simply for purpose of transportation. While in this condition the tractor may with the provision of a suitable draw bar or other hitch, be used similarly to any draw-bar tractor, it is nevertheless intended primarily for attachment to farm implements, especially those of the high wheel type as cultivators, thereby converting the ordinary horse-drawn cultivator into a tractor-propelled cultivator. To this end it will be manifest that the rear ends 13 of the side sills 8 and 9 may be secured as by means of bolts through any of the holes 14, to a cultivator frame.

The side sills 8 and 9 converge forwardly and are seated upon and bolted to elongated ledges 15 cast integral with an interposed gear casing, designated generally by 16, which will be referred to more fully hereinafter. Longitudinally extending power plant sills 17 are bolted at their forward ends to the sills 8 and 9 and at their rear ends to a transverse angle iron bar 18, in turn bolted at its ends to said side sills. A suitable motor in the form of an internal combustion engine 21 is mounted on the power plant sills 17 and adapted to drive a horizontal propelling shaft 22 through the agency of a suitable clutch, such for example as a friction clutch designated generally by 23.

This clutch is adapted to be engaged and disengaged by operation of the lever 24 from the operator's seat.

The gear casing 16 above referred to, is shaped to provide a vertical wall 26, preferably of circular form and in such compact relation with the sill-supporting ledges 15 that the latter are substantially tangential to the annular wall. Suitable roller bearings 27 and 28 are carried in the vertical wall 26, in which bearings the propelling shaft 22 is journaled. Said casing has a bottom wall 29 carrying concentric with the wall 26, a roller bearing 31 for a vertical propelling shaft 32 which will be presently described, and has also an outstanding annular bearing flange 33 providing an annular horizontal bearing 34 and vertical bearing wall 35 for a steering wheel casing designated generally by 36 which also will be presently described. Within the casing 16, there is loosely mounted on the propelling shaft 22, a pair of opposed bevel gear pinions 37 and 38 which are in constant mesh with an interposed bevel gear 39 fixed to the shaft 32. A clutch element 41 splined on the shaft 22 is adapted to be shifted lengthwise thereon by means of a shifter rod 42 operated from the operator's seat by a connection 43 for engaging the clutch teeth at either end of the clutch element with the complemental teeth on the gear pinions 37 and 38. That is, by connecting the gear pinion 37 to the driving shaft 22 through the agency of the clutch element 41, the shaft 32 will be driven for propelling the tractor forwardly and by connecting the gear pinion 38, the drive will be reversed. A cover plate 44 closes the top of the gear case 16, which may be removed for inspection of the gears or for any service requirement.

The steering wheel casing 36 has an upright column terminating in an annular bearing portion 45 which seats against bearings 34 and 35 and is held against displacement by an annular gib plate 46. A number of thin shims 47 interposed between the plate 46 and the flange 33 may be removed when required to take up for wear. The steering wheel casing 36 carries suitable bearings 48 and 49 for the lower end of the shaft 32, the bearing 49 being carried by a removable bracket 51 of sufficient size to permit passage of a worm 52, which is fixed to the shaft 32 between said lower bearings. A worm gear 53 disposed at the rear of the worm 52 and constantly in mesh therewith, is fixed to an axle 54, which is journaled in bearings 55 carried by the side plates 56 removably secured to the rearwardly projecting portion 57 of the steering wheel casing. Driving and steering wheels 58 are fixed to the ends of the axle 54 in relatively close relation.

The steering-wheel casing is equipped with a segmental worm gear 59 with which meshes a worm 61 fixed to a shaft 62 which is journaled in suitable bearings and adapted to be turned by a hand wheel 63. Manifestly, the tractor may be steered by the hand wheel 63 which turns the casing 36 on the annular bearings 34 and 35.

To start the tractor the operator holds the friction clutch 23 out of engagement, then engages the clutch element 41 with either gear pinion 37 or 38 according to whether it is desired to drive forward or backward, and upon engagement of the clutch the shafts 22 and 23 will be driven, thereby transmitting the drive to the driving steering wheels. It will be noted that the driving wheels are connected with the tractor frame after the fashion of a caster wheel and that by driving through means of a worm positioned in front of the worm gear and about which the wheels turn when steering, the latter operation is not impaired by the transmission of power for driving. Such arrangement, therefore, promotes easy steering and also greatly simplifies the number of parts required in the driving train between the motor and wheels. There is also the advantage that in a light weight tractor the greatest proportion of the weight is directly on the driving wheels, thereby increasing the traction. Another advantage of the foregoing construction is that by extending the driving shaft 22 forwardly through the bearing 27 and providing a hand crank 64 at the front of the tractor for turning the shaft by hand, the tractor may be manually propelled either forward or backward, assuming that the clutch 23 is disengaged. This may be accomplished by comparatively little manual effort by reason of the fact that the drive is directly transmitted through the worm and worm gears. Such operation is especially desirable when moving the tractor short distances without the aid of the motor, when loading and unloading the tractor as upon inclined ways, and in the field under circumstances when the hand power may be more favorably used than the motor power.

From the foregoing, it will be evident that by reason of the construction of the gear casing 16 and the steering-wheel casing 36, the several co-ordinating parts and the driving train are very compactly arranged. This arrangement also promotes efficient operation and enables ready access to all parts for inspection and repair. Such construction by reason of its simplicity, also promotes economy in the production of tractors of this type.

It is believed that the foregoing conveys a clear understanding of the objects prefaced above, and while I have illustrated but a single working embodiment, it should be understood that changes might be made in the construction and arrangement without departing from the spirit and scope of the invention as expressed in the appended claim.

I claim:

A tractor unit of the character described comprising a motor-supporting frame having forwardly converging side sills, a gear casing interposed between the forward ends of said sills and shaped to provide side ledges on which the sills are seated and secured, the casing having a closed bottom and an outer annular horizontal bearing below said ledges, a fore-and-aft motor-driven propeller shaft passing through said casing and journaled in the front and rear walls thereof, opposed bevel gears loose on said shaft within the casing, a vertical propeller shaft journaled in the bottom wall of said casing and equipped therein with a bevel gear in mesh with each of said bevel gears, a clutch on the first mentioned propeller shaft for connecting either of its gears thereto, a wheel casing having an upright column journaled on said horizontal bearing portion of the gear casing, a through axle journaled in the lower end of said column, a drive wheel fixed to each end of said axle, a worm gear fixed to said axle within the column, a worm on said vertical propeller shaft meshing with said worm gear, and steering means for turning said column on its bearing.

CHARLES E. BORING.